(12) United States Patent
Brunell

(10) Patent No.: US 7,421,354 B2
(45) Date of Patent: Sep. 2, 2008

(54) SYSTEMS AND METHODS FOR REDUCING AN EFFECT OF A DISTURBANCE

(75) Inventor: Brent Jerome Brunell, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/549,320

(22) Filed: Oct. 13, 2006

(65) Prior Publication Data

US 2008/0091375 A1  Apr. 17, 2008

(51) Int. Cl.
*G01R 29/26* (2006.01)

(52) U.S. Cl. ...................................... 702/69

(58) Field of Classification Search ............ 702/17, 702/69, 70, 190, 191, 195
See application file for complete search history.

(56) References Cited

U.S. PATENT DOCUMENTS

| | | | |
|---|---|---|---|
| 5,627,896 A | 5/1997 | Southward et al. | |
| 5,796,849 A | 8/1998 | Coleman et al. | |
| 6,460,001 B1 * | 10/2002 | Yamaguchi et al. | ........... 702/69 |
| 6,665,526 B2 * | 12/2003 | Tsuji et al. | ................. 455/296 |
| 6,735,538 B1 * | 5/2004 | Yamaguchi et al. | ........... 702/69 |
| 6,823,253 B2 | 11/2004 | Brunell | |
| 6,823,675 B2 | 11/2004 | Brunell et al. | |
| 6,863,497 B2 | 3/2005 | Seydel et al. | |
| 6,882,889 B2 | 4/2005 | Fuller et al. | |
| 7,143,323 B2 * | 11/2006 | Sweet | ........................ 714/724 |
| 2004/0117692 A1 * | 6/2004 | Sweet | ........................ 714/701 |
| 2004/0260492 A1 * | 12/2004 | Halle et al. | .................. 702/69 |
| 2005/0193739 A1 | 9/2005 | Brunell et al. | |
| 2006/0238151 A1 * | 10/2006 | Okamoto | .................... 318/254 |
| 2007/0162161 A1 | 7/2007 | Kumar | |

OTHER PUBLICATIONS

Brunell, Brent J., GT2004-53780, Model Adaptation and Nonlinear Model Predictive Control of an Aircraft Engine, Proceedings of Turbo Expo 2004, ASME Turbo Expo, Jun. 14-17, 2004, pp. 1-10, Vienna Austria.

* cited by examiner

*Primary Examiner*—Michael P Nghiem
(74) *Attorney, Agent, or Firm*—Scott J. Asmus

(57) ABSTRACT

A method for reducing an effect of a disturbance signal on an output of a dynamic system. The method includes generating an increment of the disturbance signal, and modifying an incremental signal input to the dynamic system based on the increment of the disturbance signal, thereby reducing the effect of the disturbance signal. According to one embodiment the method includes generating an increment by calculating a difference between two values sampled during consecutive sampling periods, wherein a first one of the two values is sampled during a first one of the consecutive sampling periods, and wherein a second one of the two values is sampled during a second one of the consecutive sampling periods, and wherein the two values are disturbances.

17 Claims, 6 Drawing Sheets

US 7,421,354 B2

SYSTEMS AND METHODS FOR REDUCING AN EFFECT OF A DISTURBANCE

STATEMENT REGARDING FEDERALLY SPONSORED RESEARCH & DEVELOPMENT

The invention described herein was made with Government support under Contract No. N00019-96-C-0176 awarded by the Department of Defense. The Government has certain rights to the invention.

BACKGROUND OF THE INVENTION

This invention relates generally to a dynamic system and more particularly to systems and methods for reducing an effect of a disturbance.

A dynamic system, such as a gas turbine, wind turbine, an engine, a motor, or a vehicle, has at least one input and provides at least one output based on the at least one input. However, the dynamic system is subjected to a plurality of disturbances, which are inputs to the dynamic system that have an undesirable effect on the at least one output.

BRIEF DESCRIPTION OF THE INVENTION

In one aspect, a method for reducing an effect of a disturbance signal on an output of a dynamic system is described. The method includes generating an increment of the disturbance signal, and modifying an incremental signal input to the dynamic system based on the increment of the disturbance signal.

In another aspect, a processor for reducing an effect of a disturbance signal on an output of a dynamic system is described. The processor is configured to generate an increment of the disturbance signal, and modify an incremental signal input to the dynamic system based on the increment of the disturbance signal.

In yet another aspect, a method for attenuating is provided. The method includes attenuating, across a range of frequencies, an impact of a disturbance on a dynamic system.

DETAILED DESCRIPTION OF THE INVENTION

Figure 1:
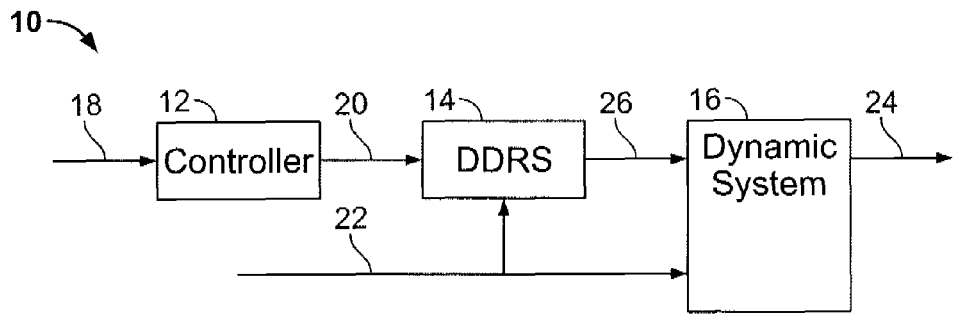
FIG. 1 is a block diagram of an exemplary system for reducing an effect of a disturbance.

FIG. 1 is a block diagram of an exemplary system 10 that may be used to facilitate reducing an effect of a disturbance. In the exemplary embodiment, system 10 includes a controller 12, a dynamic disturbance reduction system (DDRS) 14, and a dynamic system 16. As used herein, the term controller is not limited to just those integrated circuits referred to in the art as a controller, but broadly refers to a computer, a processor, a microcontroller, a microcomputer, a programmable logic controller, an application specific integrated circuit, and other programmable circuits. Moreover, examples of DDRS 14 include, but are not limited to, a controller, a computer, a processor, a microcontroller, a microcomputer, a programmable logic controller, an application specific integrated circuit, and other programmable circuits. An example of dynamic system 16 includes, but is not limited to, a water tank, a gas tank, an engine system, such as, an internal combustion engine, a diesel engine, or a gas turbine used in power plants or alternatively aircraft propulsion, and a vehicle. Examples of the vehicle include a car, an airplane, a truck, and a motorcycle. Dynamic system 16 can be a single-input-single-output (SISO) system or alternatively system 16 can be a multiple-input-multiple-output (MIMO) system. Dynamic system 16 may include a magnet, an electrical device, a mechanical device, and/or a chemical substance. Dynamic system 16 may be implemented in, but is not limited to being implemented in, aerospace industry, marine industry, paper industry, automotive industry, plastic industry, food industry, and/or pharmaceutical industry.

Controller 12 receives from a supervisory system, such as a person or supervisory computer, via an input device, a discrete controller input signal 18 or $R_k$, which is a signal in a discrete time domain, and processes the input signal 18 or $R_k$ to output a discrete controller output signal 20 or $v_k$, which is a signal in the discrete time domain. The variable k is an integer. Each value of k represents a sampling period $t_s$ described below. For example, k=1 represents a first sampling period and k=2 represents a second sampling period. Controller 12 receives controller input signal 18 from the person via an input device, or from a supervisory computer across a communication device, or from a supervisory algorithm in-situ with the discrete controller 12. An example of the input device includes a mouse, keyboard, or any other analog or digital communication device. An example of a process performed by controller 12 on discrete controller input signal 18 includes integration, filtering, and/or determining a rate of change of information within discrete controller input signal 18. An example of discrete controller input signal 18 includes a signal representative of a thrust demand, which is an amount of thrust, of a propulsion system and a power demand, which is an amount of power, of a power plant. Other examples of discrete controller input signal 18 include a signal representative of a rate of change of an altitude and a rate of change of speed. Examples of discrete controller output signal 20 include a signal representative of a rate of the thrust demand, a rate of change of the power demand, a rate of change of fuel flow, and a rate of change of an exhaust nozzle area.

DDRS 14 receives discrete controller output signal 20 and a discrete disturbance signal 22 or $d_k$, which is a signal in the discrete time domain. DDRS 14 reduces an effect of discrete disturbance signal 22 on a dynamic system output signal 24 or $y_k$, which is a signal in the discrete time domain, by generating a discrete DDRS output signal 26 or $u_k$, which is a signal in the discrete time domain. Examples of discrete dynamic system output signal 24 include a signal representative of an engine pressure ratio (EPR) across an engine within dynamic system 16, a thrust output by dynamic system 16, a speed of dynamic system 16, a power of dynamic system 16, and/or an increase or decrease in a level of fluid within a fluid tank. Examples of discrete disturbance signal 22 include a signal representative of a flow of air, a flow of fuel, a flow of water, or a flow of chemical into dynamic system 16, at least one environmental ambient condition, such as humidity or condensation, due to weather or an operating condition surrounding dynamic system 16, a temperature or alternatively pressure of the atmosphere surrounding dynamic system 16, a flow of energy from an actuator or alternatively an effector into dynamic system 16, and/or a variable geometry, such as a plurality of variable stator vanes, a plurality of variable guide vanes, a plurality of variable by-pass ratios, which change basic physical relationships in dynamic system 16.

A sensor, such as a position sensor, a flow sensor, a temperature sensor or a pressure sensor, measures a parameter, such as a position, a flow, a temperature or alternatively a pressure, of a sub-system, such as a tire or an engine, within dynamic system 16 to generate discrete disturbance signal 22. Alternatively, discrete disturbance signal 22 can be estimated or calculated by an estimation algorithm executed by a controller. For example, discrete disturbance signal 22 can be a temperature calculated or estimated, by the estimation algorithm and the estimation algorithm calculates or estimates the temperature by using information from one or a combination of sensors including a speed sensor, a pressure sensor that senses a pressure at a location within or alternatively outside dynamic system 16, and a plurality of temperatures sensors that sense temperatures at a plurality of locations in dynamic system 16. It is noted that in an alternative embodiment, at least one of controller 12 and DDRS 14 are coupled to a memory device, such as a random access memory (RAM) or a read-only memory (ROM), and an output device, such as a display, which can be a liquid crystal display (LCD) or a cathode ray tube (CRT).

Figure 2:
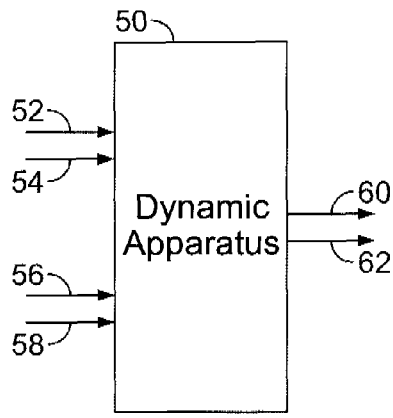
FIG. 2 is a block diagram of an exemplary dynamic apparatus which may be used with the system shown in FIG. 1.

FIG. 2 is a block diagram of a dynamic apparatus 50, which is an example of dynamic system 16. In the exemplary embodiment, exemplary dynamic apparatus 50 is a Multiple-Input Multiple-Output (MIMO) dynamic apparatus that receives a plurality of discrete dynamic apparatus input signals 52 and 54, receives a plurality of discrete dynamic apparatus disturbance signals 56 and 58, and generates a plurality of discrete dynamic apparatus output signals 60 and 62 based on input signals 52 and 54 and/or disturbance signals 56 and 58. Each discrete dynamic apparatus input signal 52 and 54 is an example of DDRS output signal 26 (shown in FIG. 1). Moreover, each discrete dynamic apparatus disturbance signal 56 and 58 is an example of disturbance signal 22 (shown in FIG. 1), and each discrete dynamic apparatus output signal 60 and 62 is an example of discrete dynamic system output signal 24. It is noted that in an alternative embodiment, dynamic apparatus 50 receives any number of discrete dynamic apparatus input signals, and outputs any number of discrete dynamic apparatus output signals based on the discrete dynamic apparatus input signals and discrete dynamic apparatus disturbance signals.

Figure 3:
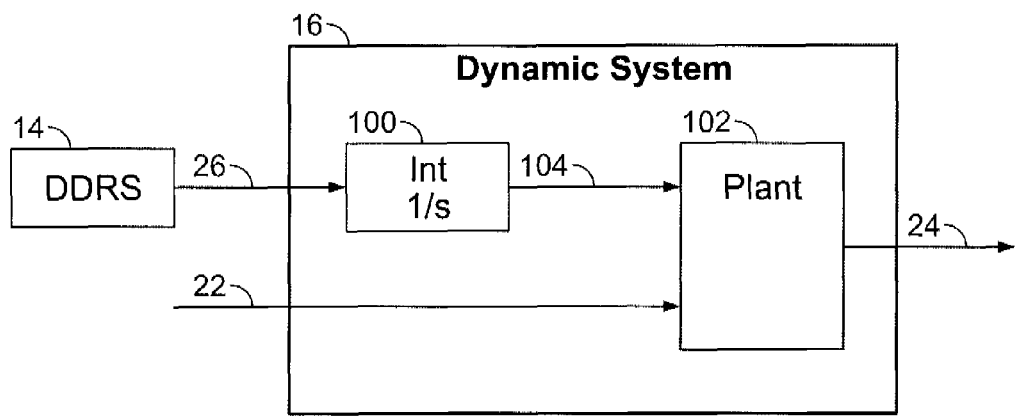
FIG. 3 is a block diagram of an alternative embodiment of a dynamic system which may be used with the system shown in FIG. 1.

FIG. 3 is a block diagram of an alternative embodiment of a dynamic system 16 that may be used with system 10 (shown in FIG. 1). Dynamic system 16 includes an integrator 100 and a plant 102. An example of plant 102 includes an engine, such as a turbine engine or a car engine, and/or an electronic commutated motor. Integrator 100 receives discrete DDRS output signal 26, and integrates discrete DDRS output signal 26 to generate a discrete integrator output signal 104. Plant 102 receives discrete integrator output signal 104 and generates discrete dynamic system output signal 24 based on output signal 104 and disturbance signal 22. For example, a turbine engine outputs thrust based on a signal representing an amount of fuel flow to the turbine engine and based on its environmental operating conditions. As another example, a vehicle engine outputs rotations per minute (RPM) of a vehicle based on a signal representing an amount of fuel flowing to the vehicle engine and the conditions in which the vehicle is operating.

DDRS 14 describes or models dynamic system 16 as a set of continuous time nonlinear equations that may be represented as $$\dot{x}_t = f(x_t, u_t, d_t) \quad (1)$$

$$y_t = h(x_t, u_t, d_t) \quad (2)$$

where $x_t$ is a state of a portion, such as a level of fluid within the fluid tank, an engine speed, or an engine temperature, of dynamic system 16, t is continuous time, $\dot{x}_t$ is a derivative, with respect to the time t, of the state $x_t$, $u_t$ is a DDRS output signal, which is a continuous form of the discrete DDRS output signal $u_k$, $d_t$ is a disturbance signal, which is a continuous form of the discrete disturbance signal $d_k$, and $y_t$ is a dynamic system output signal 24, which is a continuous form of the discrete dynamic system output signal $y_k$. For example, $u_k$ is generated by sampling $u_t$, $d_k$ is generated by sampling $d_t$, and $y_k$ is generated by sampling $y_t$. In one embodiment, f and h are each a nonlinear function. An example of the state $x_t$ is a temperature of the turbine engine and/or a temperature of the car engine. Other examples of the state $x_t$ include a speed of a rotating mass, a pressure, an amount of heat, an amount of potential energy, and/or an amount of kinetic energy contained in an energy storing element or device located within dynamic system 16.

DDRS 14 defines a nominal state value $\bar{x}_t$, which is a particular value of the state $x_t$ at a reference time and defines an incremental state variable $\tilde{x}_t$ for the state $x_t$ as:

$$x_t = \bar{x}_t + \tilde{x}_t \quad (3)$$

where $\tilde{x}_t$ is an increment to the nominal state value $\bar{x}_t$. Similarly, DDRS 14 defines a nominal input value $\bar{u}_t$, which is a particular value at the reference time of the DDRS output signal $u_t$ and defines an incremental input variable $\tilde{u}_t$ for the DDRS output signal $u_t$ as $$u_t = \bar{u}_t + \tilde{u}_t \quad (4)$$

where $\tilde{u}_t$ is an increment to the nominal input value $\bar{u}_t$. Moreover, DDRS 14 defines a nominal output value, which is a particular value at the reference time of the dynamic system output signal $y_t$, and defines an incremental output variable $\tilde{y}_t$ for dynamic system output signal $y_t$ as:

$$y_t = \bar{y}_t + \tilde{y}_t \quad (5)$$

where $\tilde{y}_t$ is an increment to the nominal output value $\bar{y}_t$. Additionally, DDRS 14 defines a nominal disturbance value $\bar{d}_t$, which is a particular value at the reference time of the disturbance signal $d_t$, and defines an incremental disturbance variable $\tilde{d}_t$ for disturbance signal $d_t$ as:

$$d_t = \bar{d}_t + \tilde{d}_t \quad (6)$$

where $\tilde{d}_t$ is an increment to the nominal disturbance value $\bar{d}_t$.

DDRS 14 linearizes the function f represented by equation (1) by applying:

$$\dot{x}_t = \dot{\bar{x}}_t + \dot{\tilde{x}}_t \qquad (7)$$

$$= f(\bar{x}_t, \bar{u}_t, \bar{d}_t) + \frac{\partial f}{\partial x_t}\bigg|_{\bar{x}_t, \bar{d}_t, \bar{u}_t} \tilde{x}_t + \frac{\partial f}{\partial u_t}\bigg|_{\bar{x}_t, \bar{d}_t, \bar{u}_t} \tilde{u}_t + \frac{\partial f}{\partial d_t}\bigg|_{\bar{x}_t, \bar{d}_t, \bar{u}_t} \tilde{d}_t$$

where $\dot{x}_t$ is a derivative, with respect to time t, of the state $x_t$, $\dot{\bar{x}}_t$ is a derivative, with respect to time t, of the nominal state value $\bar{x}_t$, $\dot{\tilde{x}}_t$ is a derivative, with respect to time t, of the incremental state variable $$\tilde{x}_t, \frac{\partial f}{\partial x_t}\bigg|_{\bar{x}_t, \bar{d}_t, \bar{u}_t}$$

is a partial derivative of the function f, with respect to $x_t$ and is evaluated at $\bar{x}_t$, $\bar{d}_t$, and $\bar{u}_t$, $$\frac{\partial f}{\partial u_t}\bigg|_{\bar{x}_t, \bar{d}_t, \bar{u}_t}$$

is a partial derivative of the function $f$, with respect to $u_t$ and is evaluated at $\bar{x}_t$, $\bar{d}_t$, and $\bar{u}_t$, and $$\frac{\partial f}{\partial d_t}\bigg|_{\bar{x}_t, \bar{d}_t, \bar{u}_t}$$

is a partial derivative of the function $f$, with respect to $d_t$ and is evaluated at $\bar{x}_t$, $\bar{d}_t$, and $\bar{u}_t$.

Moreover, DDRS 14 expands the function h represented by equation (2) by applying:

$$y_t = \bar{y}_t + \tilde{y}_t \qquad (8)$$

$$= h(\bar{x}_t, \bar{u}_t, \bar{d}_t) + \frac{\partial h}{\partial x_t}\bigg|_{\bar{x}_t, \bar{d}_t, \bar{u}_t} \tilde{x}_t + \frac{\partial h}{\partial u_t}\bigg|_{\bar{x}_t, \bar{d}_t, \bar{u}_t} \tilde{u}_t + \frac{\partial h}{\partial d_t}\bigg|_{\bar{x}_t, \bar{d}_t, \bar{u}_t} \tilde{d}_t$$

where $$\frac{\partial h}{\partial x_t}\bigg|_{\bar{x}_t, \bar{d}_t, \bar{u}_t}$$

is a partial derivative of the function h, with respect to $x_t$ and is evaluated at $\bar{x}_t$, $\bar{d}_t$, and $\bar{u}_t$, $$\frac{\partial h}{\partial u_t}\bigg|_{\bar{x}_t, \bar{d}_t, \bar{u}_t}$$

is a partial derivative of the function h, with respect to $u_t$ and is evaluated at $\bar{x}_t$, $\bar{d}_t$, and $\bar{u}_t$, and $$\frac{\partial h}{\partial d_t}\bigg|_{\bar{x}_t, \bar{d}_t, \bar{u}_t}$$

is a partial derivative of the function h, with respect to $d_t$ and is evaluated at $\bar{x}_t$, $\bar{d}_t$, and $\bar{u}_t$.

DDRS 14 represents a change in the state $x_t$ as a function of a change in DDRS output signal $u_t$ and a change in the disturbance signal $d_t$ by representing the derivative $\dot{\tilde{x}}$ of the incremental state variable $\tilde{x}_t$ as a function of the incremental disturbance variable $\tilde{d}_t$ and a function of the incremental input variable $\tilde{u}_t$ as:

$$\dot{\tilde{x}}_t = f(\bar{x}_t, \bar{u}_t, \bar{d}_t) + \frac{\partial f}{\partial x_t}\bigg|_{\bar{x}_t, \bar{d}_t, \bar{u}_t} \tilde{x}_t + \frac{\partial f}{\partial u_t}\bigg|_{\bar{x}_t, \bar{d}_t, \bar{u}_t} \tilde{u}_t + \frac{\partial f}{\partial d_t}\bigg|_{\bar{x}_t, \bar{d}_t, \bar{u}_t} \tilde{d}_t - \dot{\bar{x}}_t \qquad (9)$$

DDRS 14 derives equation (9) by making $\dot{\tilde{x}}_t$ the subject of equation (7). Moreover, DDRS 14 represents a change in the dynamic system output signal $y_t$ as a function of a change in the DDRS output signal $u_t$ and a change in the disturbance signal $d_t$ by representing the incremental output variable $\tilde{y}_t$ as a function of the incremental disturbance variable $\tilde{d}_t$ and a function of the incremental input variable $\tilde{u}_t$ as:

$$\tilde{y}_t = \qquad (10)$$

$$h(\bar{x}_t, \bar{u}_t, \bar{d}_t) + \frac{\partial h}{\partial x_t}\bigg|_{\bar{x}_t, \bar{d}_t, \bar{u}_t} \tilde{x}_t + \frac{\partial h}{\partial u_t}\bigg|_{\bar{x}_t, \bar{d}_t, \bar{u}_t} \tilde{u}_t + \frac{\partial h}{\partial d_t}\bigg|_{\bar{x}_t, \bar{d}_t, \bar{u}_t} \tilde{d}_t - \bar{y}_t$$

DDRS 14 derives equation (10) by making $\tilde{y}_t$ the subject of equation (8).

DDRS 14 substitutes $$\dot{\bar{x}}_t = f(\bar{x}_t, \bar{u}_t, \bar{d}_t) = 0,$$

substitutes $A_c$ instead of $$\frac{\partial f}{\partial x_t}\bigg|_{\bar{x}_t, \bar{d}_t, \bar{u}_t},$$

substitutes $B_{cu}$ instead of $$\frac{\partial f}{\partial u_t}\bigg|_{\bar{x}_t, \bar{d}_t, \bar{u}_t},$$

and $B_{cd}$ instead of $$\frac{\partial f}{\partial d_t}\bigg|_{\bar{x}_t, \bar{d}_t, \bar{u}_t}$$

in equation (9) to generate:

$$\dot{\tilde{x}}_t = A_c\tilde{x}_t + B_{cu}\tilde{u}_t + B_{cd}\tilde{d}_t + f. \quad (11)$$

It is noted that $$\dot{\bar{x}}_t = 0$$

when $\bar{x}_t$ is a constant, an equilibrium solution, or a steady state of the portion of dynamic system 16. When $\bar{x}_t$ is a constant, regardless of the time t, $f(\bar{x}_t,\bar{u}_t,\bar{d}_t)$ is also a constant regardless of the time t of evolution of representation of dynamic system 16, DDRS 14 derives $\bar{y}_t$ from equation (2) by applying:

$$\bar{y}_t = h(\bar{x}_t,\bar{u}_t,\bar{d}_t) \quad (12)$$

Moreover, DDRS 14 substitutes $\bar{y}_t$ instead of $h(\bar{x}_t,\bar{u}_t,\bar{d}_t)$ a matrix C instead of $$\left.\frac{\partial h}{\partial x_t}\right|_{\bar{x}_t,\bar{d}_t,\bar{u}_t},$$

a matrix $D_u$ instead of $$\left.\frac{\partial h}{\partial u_t}\right|_{\bar{x}_t,\bar{d}_t,\bar{u}_t},$$

and a matrix $D_d$ instead of $$\left.\frac{\partial h}{\partial d_t}\right|_{\bar{x}_t,\bar{d}_t,\bar{u}_t}$$

of in equation (10) to generate:

$$\tilde{y}_t = C\tilde{x}_t + D_u\tilde{u}_t + D_d\tilde{d}_t \quad (13)$$

DDRS 14 generates a discrete time model of equation (11) by substituting $\tilde{x}_k$ instead of $\tilde{x}_t$, $\tilde{u}_k$ instead of $\tilde{u}_t$, $\tilde{d}_k$ instead of $\tilde{d}_t$ to generate:

$$\tilde{x}_{k+1} = A\tilde{x}_k + B_u\tilde{u}_k + B_d\tilde{d}_k + F_k \quad (14)$$

where DDRS 14 calculates a matrix A as being equal to $I+A_ct_s$, calculates a matrix $B_u$ to be equal to $B_{cu}t_s$, a matrix $B_d$ to be equal to $B_{cd}t_s$, $F_k$ to be equal to $f(\bar{x}_t,\bar{u}_t,\bar{d}_t)t_s$, $\tilde{x}_k$, an incremental discrete state, to be equal to a discrete form of $\tilde{x}_t$, $\tilde{u}_k$, an incremental discrete DDRS output signal 26, to be equal to a discrete form of $\tilde{u}_t$, and $\tilde{d}_k$, an incremental discrete disturbance signal, to be a discrete form of $\tilde{d}_t$, $t_s$ is a sampling time or the sampling period, I is an identity matrix, and $\tilde{x}_{k+1}$ is an incremental discrete state. Moreover $\tilde{x}_{k+1}$ of equation (14) can also be represented as a difference between a discrete state $x_{k+1}$ and $x_k$, where $x_{k+1}$ is a discrete state of the portion of dynamic system 16 sampled during a sampling period k+1 and is generated one sampling period after $x_k$ is generated, and $\tilde{x}_k$ is the incremental discrete state. A microprocessor or a controller samples $x_k$ from $x_t$ with the sampling period $t_s$, samples $y_k$ from $y_t$ with the sampling period $t_s$, samples $u_k$ from $u_t$ with the sampling period $t_s$, and samples $d_k$ from $d_t$ with the sampling period $t_s$. It is noted that $d_k$, $u_k$, $x_k$, and $y_k$ are samples that are sampled at the same time or during the same sampling period k.

Furthermore, DDRS 14 generates a discrete time model of equation (13) by substituting $\tilde{x}_k$ instead of $\tilde{x}_t$, $\tilde{u}_k$ instead of $\tilde{u}_t$, and $\tilde{d}_k$ instead of $\tilde{d}_t$ in equation (13) to generate:

$$\tilde{y}_k = C\tilde{x}_k + D_u\tilde{u}_k + D_d\tilde{d}_k \quad (15)$$

where $\tilde{y}_k$ is an incremental discrete dynamic system output signal of dynamic system 16, where $\tilde{y}_k$ is represented by a discrete form, $y_k = \bar{y}_k + \tilde{y}_k$, of the definition as provided in equation (5). If dynamic system 16 is a relative degree one system, DDRS 14 formulates a desired response of dynamic system 16 as being a first order desired response. The relative degree one system takes one sample period to change an output of dynamic system 16 based on an input to dynamic system 16. For example, when an input to dynamic system 16 is $u_k$, the relative degree one system outputs $y_{k+1}$, which is a dynamic system output signal that is output from dynamic system 16 one sample period after $y_k$ is output from dynamic system 16. DDRS 14 generates equations (16)-(25) based on the relative degree one system. A method similar to that of deriving equations (16)-(25) can be used to derive a plurality of equations for a dynamic system of any relative degree, such as degrees two thru twenty. One form of the first order desired response is an integrator which can be written as follows:

$$\tilde{y}_{k+1} - \tilde{y}_k = t_s\tilde{v}_k \quad (16)$$

where $\tilde{y}_{k+1}$ is a future incremental discrete dynamic system output from dynamic system 16 one sample after the current sample $\tilde{y}_k$ is output from dynamic system 16, $\tilde{v}_k$ is an incremental discrete controller output signal obtained as a difference between the discrete controller output signal $\bar{v}_k$ and a nominal discrete controller output signal $v_k$, which is a particular value of the discrete controller output signal $v_k$ at the reference time. The relative degree one dynamic system is an example of dynamic system 16.

DDRS 14 generates $\tilde{y}_{k+1}$ from equation (15) as:

$$\tilde{y}_{k+1} = C\tilde{x}_{k+1} + D_u\tilde{u}_{k+1} + D_d\tilde{d}_{k+1} \quad (17)$$

where $\tilde{d}_{k+1}$, can also be represented as a difference between $d_{k+1}$ and $d_k$, where $d_{k+1}$ is a discrete disturbance signal input to dynamic system 16 during a sampling period k+1, and is generated one sampling period after $d_k$ is generated, and $\tilde{u}_{k+1}$ can also be represented as a difference between $u_{k+1}$ and $u_k$, where $u_{k+1}$ is a discrete DDRS output signal output by DDRS 14 during a sampling period k+1, and is generated one sampling period after $u_k$ is generated. DDRS 14 substitutes $\tilde{x}_{k+1}$ from equation (14) and $D_u=0$ for the relative degree one system into equation (17) to generate:

$$\tilde{y}_{k+1} = CA\tilde{x}_k + CB_u\tilde{u}_k + CB_d\tilde{d}_k + CF_k + D_d\tilde{d}_{k+1}. \quad (18)$$

DDRS 14 further substitutes $D_u=0$ and equations (15) and (18) into the first desired response, represented by equation (16), to generate:

$$CA\tilde{x}_k + CB_u\tilde{u}_k + CB_d\tilde{d}_k + D_d\tilde{d}_{k+1} + CF_k - C\tilde{x}_k - D_d\tilde{d}_k = st\tilde{v}_k \quad (19)$$

DDRS 14 solves for $\tilde{u}_k$ as $$\tilde{u}_k = |CB_u|^{-1}\{t_s\tilde{v}_k + (C-CA)\tilde{x}_k + (D_d-CB_d)\tilde{d}_k - D_d\tilde{d}_{k+1} - CF_k\} \quad (20)$$

DDRS 14 defines $x_k = \bar{x}_k$ within a relationship:

$$x_k = \bar{x}_k + \tilde{x}_k \quad (21)$$

to generate $$\tilde{x}_k = 0 \quad (22)$$

where $\bar{x}_k$ is a nominal discrete state value, which is a particular value at the reference time of the discrete state $x_k$. Equation (21) is a discrete form of the relation expressed by equation (3).

DDRS 14 substitutes $2\tilde{d}_k$ instead of $\tilde{d}_{k+1}$ in equation (20) and substitutes equation (22) into equation (20) to generate:

$$\tilde{u}_k = |CB_u|^{-1}\{t_s\tilde{v}_k - CF_k + (-D_d - CB_d)\tilde{d}_k\} \quad (23)$$

DDRS 14 generates the discrete DDRS output signal $u_k$ as being:

$$u_k = u_{k-1} + \tilde{u}_k \quad (24)$$

where $u_{k-1}$ is a discrete DDRS output signal output by DDRS 14 at k−1 and generated one sampling period before $u_k$ is output by DDRS 14, and $\tilde{u}_k$ is a discrete form in the discrete time domain of $\tilde{u}_t$. DDRS 14 substitutes equation (23) into equation (24), substitutes $K_1$ instead of $|CB_u|^{-1}t_s$ in equation (24), $K_3$ instead of $-|CB_u|^{-1}C$ in equation (24), and $K_d$ instead of $|CB_u|^{-1}(-D_d - CB_d)$ in equation (24) to generate:

$$u_k = u_{k-1} + K_1\tilde{v}_k + K_3 F_k + K_d \tilde{d}_k \quad (25)$$

DDRS 14 computes $K_d$ at least one of before and during energization of dynamic system 16. For example, DDRS 14 computes $K_d$ on-line in real time while dynamic system 16 is being operated by a power source. As another example, DDRS 14 computes $K_d$ off-line before dynamic system 16 is provided power by the power source. DDRS 14 changes $u_k$ at the same time the disturbance signal $d_t$ is input to dynamic system 16. Accordingly, an impact of the disturbance signal $d_t$ on dynamic system 16 is reduced.

As an alternative to formulating the first desired response, DDRS 14 formulates one form of a second order desired response as:

$$\tilde{y}_{k+2} - (1+\alpha)\tilde{y}_{k+1} + \alpha\tilde{y}_k = (1-\alpha)t_s\tilde{v}_k \quad (26)$$

where $$\alpha = \left(1 - \frac{ts}{\tau}\right),$$

$\tau$ is a time constant of dynamic system 16, $\tilde{y}_{k+2}$ is an incremental discrete dynamic system output signal, and $\tilde{y}_{k+2}$ can also be represented as a difference between a dynamic system output signal $y_{k+2}$ output by dynamic system 16 and $y_{k+1}$, where $y_{k+2}$ is sampled during a sampling period k+2 and is generated one sampling period after $y_{k+1}$ is generated. If dynamic system 16 is a relative degree two system, DDRS 14 formulates a desired response of dynamic system 16 as being the second order desired response. The relative degree two system takes two sample periods to change an output of dynamic system 16 based on an input to dynamic system 16. For example, when an input to dynamic system 16 is $u_k$, the relative degree one system outputs $y_{k+2}$, which is two sample periods after $y_k$. DDRS 14 generates equations (26)-(34) based on the relative degree two system. The relative degree two system is an example of dynamic system 16.

DDRS 14 substitutes $CB_u = 0$ in equation (18) to output:

$$\tilde{y}_{k+1} = CA\tilde{x}_k + CB_d\tilde{d}_k + CF_k + D_d\tilde{d}_{k+1} \quad (27)$$

DDRS 14 generates $\tilde{y}_{k+2}$ from $\tilde{y}_{k+1}$ of equation (27) as being:

$$\tilde{y}_{k+2} = CA\tilde{x}_{k+1} + CB_d\tilde{d}_{k+1} + CF_{k+1} + D_d\tilde{d}_{k+2} \quad (28)$$

where $\tilde{d}_{k+2}$ is an incremental discrete disturbance signal and can also be represented as a difference between a discrete disturbance signal $d_{k+2}$ input to dynamic system 16 and $d_{k+1}$, where $d_{k+2}$ is sampled during a sampling period k+2 and is generated one sampling period after $d_{k+1}$ is generated, and $F_{k+1}$ is generated during a sampling period k+1, which is one sampling period after $F_k$ is generated. DDRS 14 substitutes equation (14) into equation (28) to generate:

$$\tilde{y}_{k+2} = CA\{A\tilde{x}_k + B_u\tilde{u}_k + B_d\tilde{d}_k + F_k\} + CB_d\tilde{d}_{k+1} + CF_{k+1} + D_d\tilde{d}_{k+2} \quad (29)$$

DDRS 14 substitutes equations (15), (27), (29), and $D_u = 0$ into equation (26) to generate:

$$CA^2\tilde{x}_k + CAB_u\tilde{u}_k + CAB_d\tilde{d}_k + CAF_k + CB_d\tilde{d}_{k+1} + CF_{k+1} + \quad (30)$$
$$D_d\tilde{d}_{k+2} \cdots - (1+\alpha)\{CA\tilde{x}_k + CB_d\tilde{d}_k + CF_k + D_d\tilde{d}_{k+1}\} +$$
$$\alpha\{C\tilde{x}_k + D_d\tilde{d}_k\} = (1-\alpha)t_s\tilde{v}_k$$

DDRS 14 solves for $\tilde{u}_k$ in equation (30) to output:

$$\tilde{u}_k = |CAB_u|^{-1} \quad (31)$$
$$\{(1-\alpha)t_s\tilde{v}_k + [(1+\alpha)CA - CA^2 - \alpha C]\tilde{x}_k + [(1+\alpha)C - CA]F_k -$$
$$CF_{k+1} \cdots + [(1+\alpha)CB_d - CAB_d - \alpha D_d]$$
$$\tilde{d}_k + [(1+\alpha)D_d - CB_d]\tilde{d}_{k+1} - D_d\tilde{d}_{k+2}\}$$

When $\bar{x}_t$, $\bar{d}_t$, $\bar{u}_t$ and $\bar{y}_t$ are constant, with respect to the time t, then:

$$F_{k+1} = t_s f(\bar{x}_{k+1}, \bar{u}_{k+1}, \bar{d}_{k+1}) = F_k \quad (32)$$

Equation (32) is calculated, by DDRS 14, based on values of the derivative $\dot{x}_t$ or an estimation algorithm that computes the derivative $\dot{x}_t$ at the current sample $x_t$. DDRS 14 substitutes $\tilde{d}_{k+1} = 2\tilde{d}_k$, $\tilde{d}_{k+2} = 3\tilde{d}_k$, and equation (32) into equation (31) to generate:

$$\tilde{u}_k = \quad (33)$$
$$|CAB_u|^{-1}\{(1-\alpha)t_s\tilde{v}_k + [(1+\alpha)CA - CA^2 - \alpha C]\tilde{x}_k + [\alpha C - CA]F_k$$
$$\cdots + [(\alpha-1)CB_d + (\alpha-1)D_d - CAB_d]\tilde{d}_k\}$$

DDRS 14 substitutes $K_5$ as being $|CAB_u|^{-1}(1-\alpha)t_s$, $K_6$ as being $|CAB_u|^{-1}[(1+\alpha)CA - CA^2 - \alpha C]$, $K_7$ as being $|CAB_u|^{-1}[\alpha C - CA]$, $K_e$ as being $|CAB_u|^{-1}[(\alpha-1)CB_d + (\alpha-1)D_d - CAB_d]$, $\tilde{x}_k = 0$, and equation (33) into equation (24) to output:

$$u_k = u_{k-1} + K_5\tilde{v}_k + K_7 F_k + K_e\tilde{d}_k \quad (34)$$

It is noted that $\tilde{x}_k = 0$ when $\bar{x}_k = x_k$.

It is noted that in an alternative embodiment, if dynamic system 16 is of a relative degree n, DDRS 14 formulates an $n^{th}$ order desired response of dynamic system 16, where n is an integer greater than two.

DDRS 14 calculates the first, second, or alternatively the nth order desired response upon receiving a selection, via the input device, regarding a number, such as 1, 2 or alternatively $n^{th}$, of a desired response. As an example, upon receiving from the person via the input device that a desired response has a first number, DDRS 14 applies an Euler's approximation to an integrator:

$$\dot{y}_t = v_t \quad (35)$$

where $v_t$ is a continuous form of $v_k$.

to generate $$y_{k+1} - y_k = t_s v_k \qquad (36)$$

DDRS 14 generates an incremental form of equation (36) to output the first order desired response. As another example, upon receiving from the person via the input device that a desired response is second order, DDRS 14 applies an Euler's approximation to a combination of an integrator and the first order desired response of dynamic system 16. The combination is represented as:

$$\tau \ddot{y}_t + \dot{y}_t = v_t \qquad (37)$$

where $\dot{y}_t$ is a derivative, with respect to the time t, of $y_t$, and $\ddot{y}_t$ is a derivative, with respect to the time t, of $\dot{y}_t$. DDRS 14 applies an Euler's approximation to the combination to generate:

$$y_{k+2} - (1+\alpha)y_{k+1} + \alpha y_k = (1-\alpha)t_s v_k \qquad (38)$$

DDRS 14 generates an incremental form of equation (38) to output the second desired response.

Figure 4:
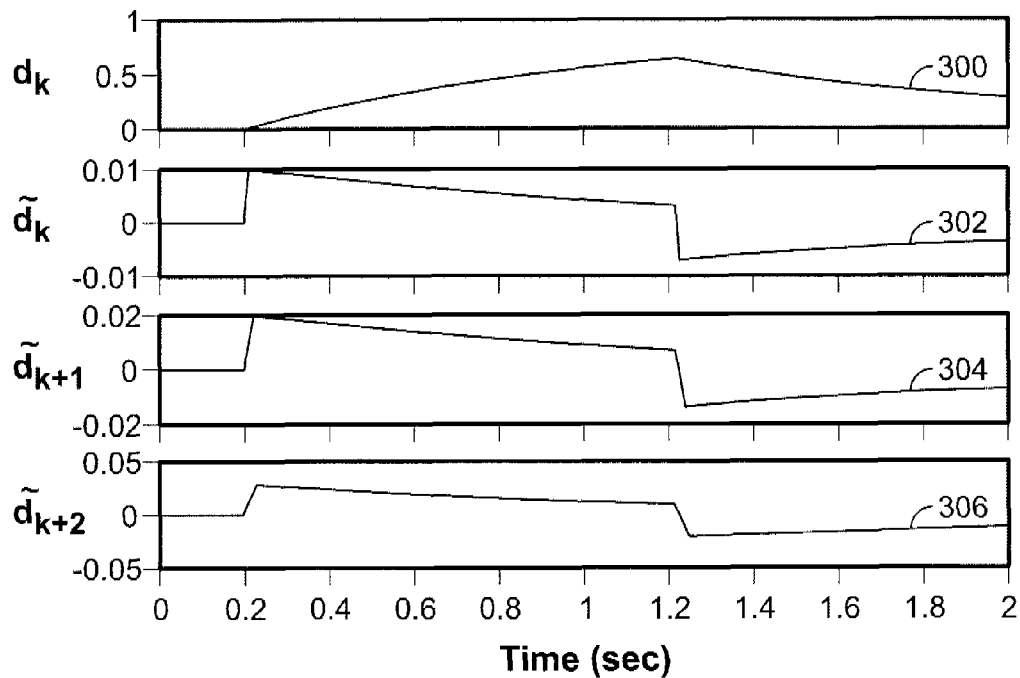
FIG. 4 shows an embodiment of a plurality of plots that may be used for reducing an effect of a disturbance.

FIG. 4 shows an embodiment of a plurality of plots 300, 302, 304, and 306 that may be used for reducing an effect of a disturbance. DDRS 14 calculates and may generate plot 300, which is an example of $d_k$ corresponding to the relative degree one system versus the time t. Moreover, DDRS 14 calculates and may generate plot 302, which is an example of $\tilde{d}_k$ plotted versus the time t and which is generated as a difference between $d_k$ and $d_{k-1}$, where $d_{k-1}$ is a discrete disturbance signal input to dynamic system 16 and measured by a sensor, such as a temperature or a pressure sensor, one sampling period before $d_k$ is measured by the sensor. Moreover, DDRS 14 calculates and may generate plot 304, which is an example of $\tilde{d}_{k+1}$ plotted versus the time t and which is generated as a difference between $d_{k+1}$ and $d_k$, where $\tilde{d}_{k+1}$ is an incremental discrete disturbance signal at k+1, where $d_{k+1}1$ is a discrete disturbance signal input to dynamic system 16 and measured by a sensor, such as a temperature or a pressure sensor, one sampling period before $d_k$ is measured by the sensor. Additionally, DDRS 14 calculates and may generate plot 306, which is an example of $\tilde{d}_{k+2}$ plotted versus the time t and which is generated as a difference between $\tilde{d}_{k+2}$ and $\tilde{d}_{k+1}$, where $\tilde{d}_{k+2}$ is an incremental discrete disturbance signal at k+2, where $d_{k+2}$ is a discrete disturbance signal input to dynamic system 16 and measured by a sensor, such as a temperature or a pressure sensor, one sampling period before $d_{k+1}$ is measured by the sensor.

Figure 5:
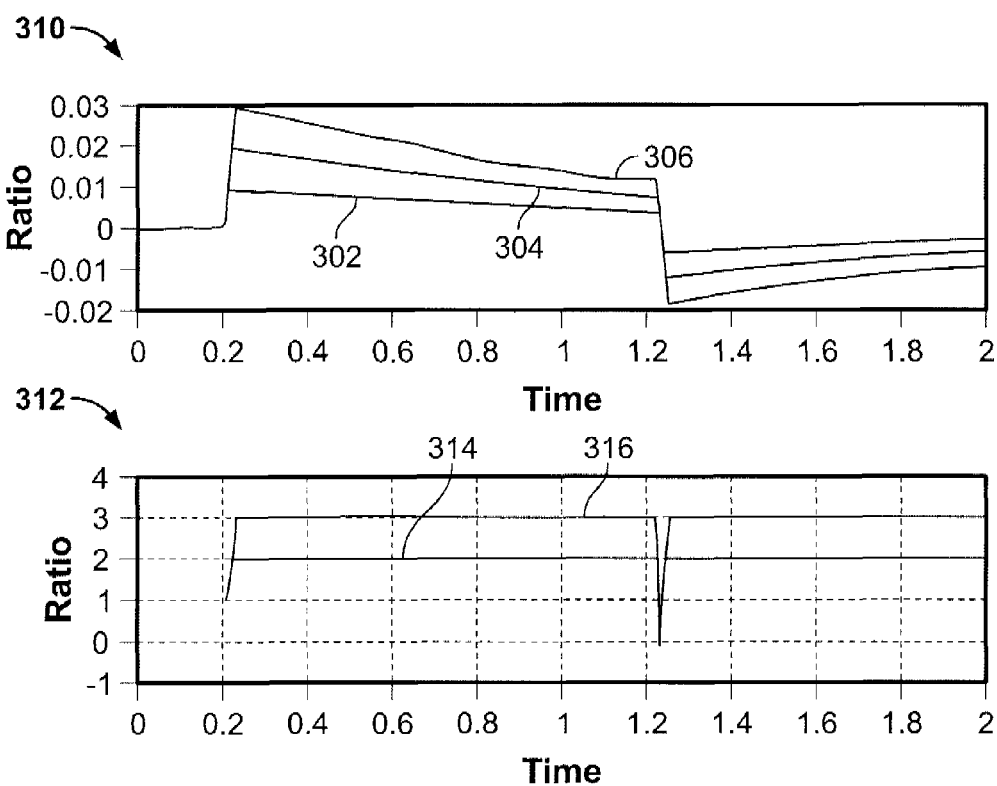
FIG. 5 shows a plurality of exemplary graphs that may be used in reducing an effect of a disturbance.

FIG. 5 shows a plurality of exemplary graphs 310 and 312 that may be used to facilitate reducing an effect of a disturbance. Graph 310 includes plots 302, 304, and 306, and graph 312 illustrates a plot of a ratio 314, versus the time t, of plots 304 and 302, and a ratio 316, versus the time t, of plots 306 and 302. DDRS 14 generates ratios 314 and 316. It is noted that for the relative degree one system, the ratio 314 is two, and therefore, for the relative degree one system, $\tilde{d}_{k+1} = 2*\tilde{d}_k$. Moreover, it is noted that for the relative degree one system, the ratio 316 is three, and therefore, for the relative degree one system, $\tilde{d}_{k+2} = 3*\tilde{d}_k$. In an alternative embodiment, for the relative degree n system, DDRS 14 determines $\tilde{d}_{k+n}$ from $\tilde{d}_k$ in a similar manner in which $\tilde{d}_{k+1}$ and $\tilde{d}_{k+2}$ are determined from $\tilde{d}_k$.

Figure 6:
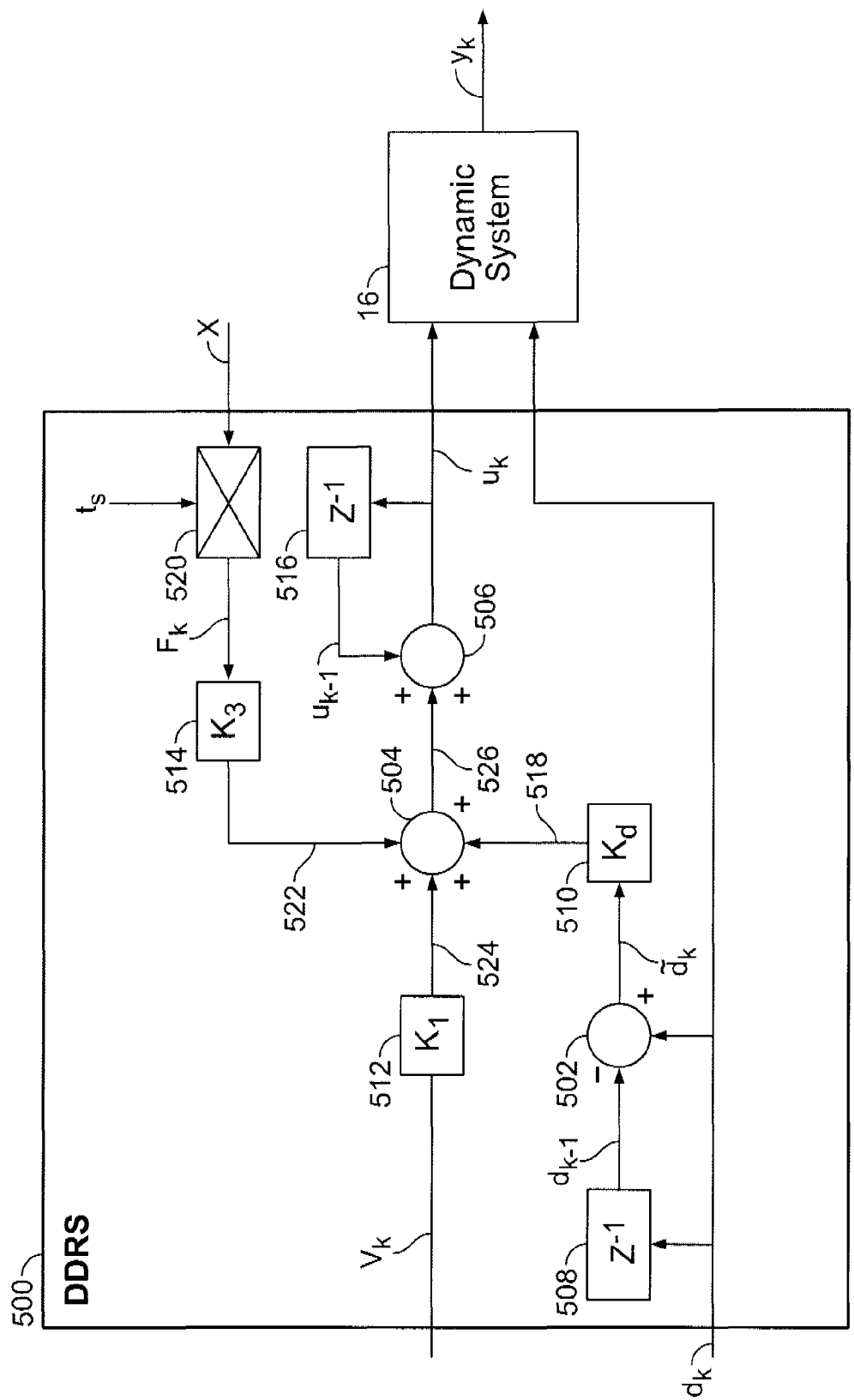
FIG. 6 is a block diagram of an exemplary dynamic disturbance rejection system (DDRS) that may be used with the system shown in FIG. 1.

FIG. 6 is a block diagram of an exemplary DDRS 500, which maybe used with system 10 (shown in FIG. 1) as a replacement for DDRS 14. Specifically, DDRS 500 may be used in system 10 to replace DDRS 14. DDRS 500 includes a subtractor 502, a plurality of adders 504 and 506, a plurality of multipliers 508, 510, 512, 514, 516, and 520, and where $K_1$, $K_3$, and $K_d$ are from equation (25).

Multiplier 508 receives the discrete disturbance signal $d_k$ and multiples $d_k$ with 1/z, which is an inverse z-transform, to output the discrete disturbance signal $d_{-1}$. Subtractor 502 receives the discrete disturbance signal $d_k$ and the discrete disturbance signal $d_{k-1}$, subtracts the discrete disturbance signal $d_{k-1}$ from the discrete disturbance signal $d_k$ to output the incremental discrete disturbance signal $\tilde{d}_k$. Multiplier 510 multiplies the incremental discrete disturbance signal $\tilde{d}_k$ with $K_d$ to output a multiplier output signal 518. Multiplier 520 multiplies the derivative $\dot{x}_t$ of the state $x_t$ with $t_s$ to output $F_k$. Multiplier 514 receives $F_k$ and multiplies $F_k$ with $K_3$ to output a multiplier output signal 522. Multiplier 512 receives $v_k$ and multiplies $v_k$ with $K_1$ to output a multiplier output signal 524. Adder 504 receives multiplier output signals 518, 522, and 524, adds the multiplier output signals 518, 522, and 524 to generate an adder output signal 526, which is $U_k - U_{k-1}$ in equation (25) and is equal to $\tilde{U}_k$. Multiplier 516 receives $u_k$ and multiplies $u_k$ with 1/z to output $u_{k-1}$. Adder 506 adds $\tilde{U}_k$ and $u_{k-1}$ to output $u_k$. During initialization of DDRS 500, an initial value, such as zero, of $u_k$, is provided by the person to DDRS 14 via the input device. Upon receiving the initial value and $\tilde{U}_k$, adder 506 outputs additional values of $u_k$. Dynamic system 16 receives $u_k$ from DDRS 14 and $u_k$ reduces an effect of $d_k$ on $y_k$.

Figure 7:
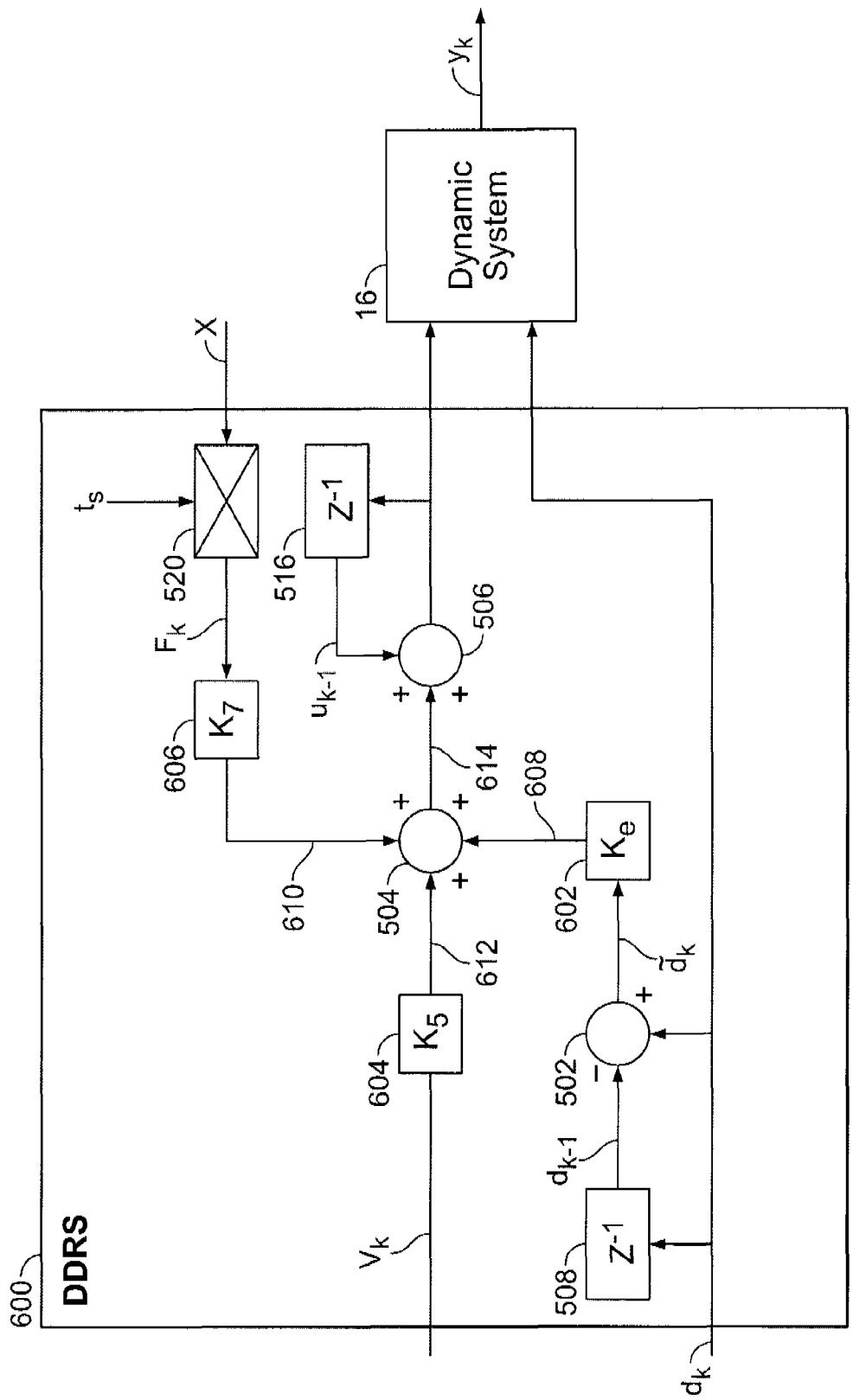
FIG. 7 is a block diagram of an alternative embodiment of a DDRS, which may be used with the system shown in FIG. 1.

FIG. 7 is a block diagram of an alternative embodiment of a DDRS 600, that may be used with system 10 (shown in FIG. 1) as a replacement for DDRS 14. DDRS 600 includes subtractor 502, adders 504, and 506, a plurality of multipliers 602, 604, and 606, and multipliers 508, 516, and 520.

Multiplier 602 multiplies the incremental discrete disturbance signal $\tilde{d}_k$ with $K_e$ to output a multiplier output signal 608. Multiplier 606 receives $F_k$ and multiplies $F_k$ with $K_7$ to output a multiplier output signal 610. Multiplier 604 receives $v_k$ and multiplies $v_k$ with $K_5$ to output a multiplier output signal 612. Adder 504 receives multiplier output signals 608, 610, and 612, adds the multiplier output signals 608, 610, and 612 to generate an adder output signal 614, which is $u_k - u_{k-1}$ in equation (34) and is equal to $\tilde{u}_k$. Dynamic system 16 receives $u_k$ from DDRS 14 and $u_k$ reduces an effect of $d_k$ on $y_k$. It is noted that $K_1$, $K_3$, $K_d$, $K_5$, $K_7$, and $K_e$ change based on a degree of dynamic system and based on other factors, such as the time constant $\tau$.

Figure 8:
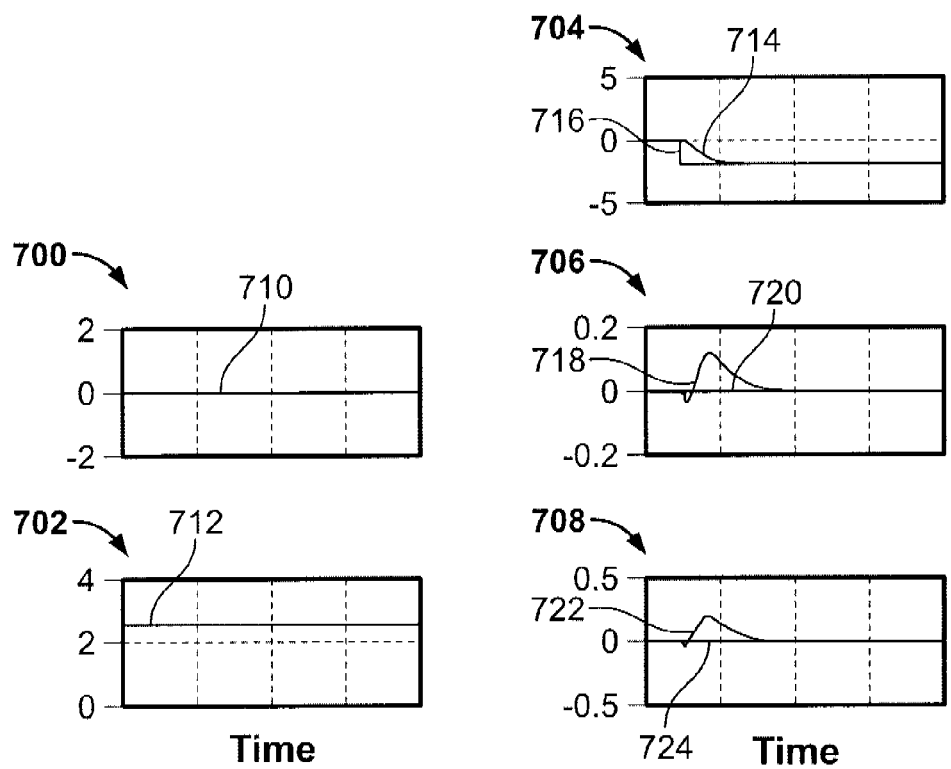
FIG. 8 illustrates a plurality of graphs showing system response illustrating an exemplary effect of basic control without dynamic disturbances.

FIG. 8 shows a plurality of exemplary graphs 700, 702, 704, 706, and 708 including a plurality of exemplary outputs from dynamic system 16. Graph 700 plots a disturbance signal 710 versus time t, graph 702 illustrates a plot of a disturbance signal 712 versus the time t, graph 704 represents a dynamic system output signal 714 versus time t and a desired response 716 of dynamic system 16 versus time t. Moreover, graph 706 illustrates a plot of a dynamic system output signal 718 versus time t and a desired response 720 of dynamic system 16 versus time t. Additionally, graph 708 illustrates a plot of a dynamic system output signal 722 versus time t and a desired response 724 of dynamic system 16 versus time t. When disturbance signals 710 and 712 are input to dynamic system 16 and no disturbance is applied to dynamic system 16, dynamic system 16 generates dynamic system output signals 714, 718, and 722. Moreover, a difference between dynamic system output signal 714 and desired response 716 is small and dynamic system output signal 714 quickly converges to desired response 716. Additionally, a coupling between desired response 720 and dynamic system output signal 718 is small, such as 9%-12%. Further, a coupling between desired response 724 and dynamic system output signal 722 is small, such as 9%-12%.

Figure 9:
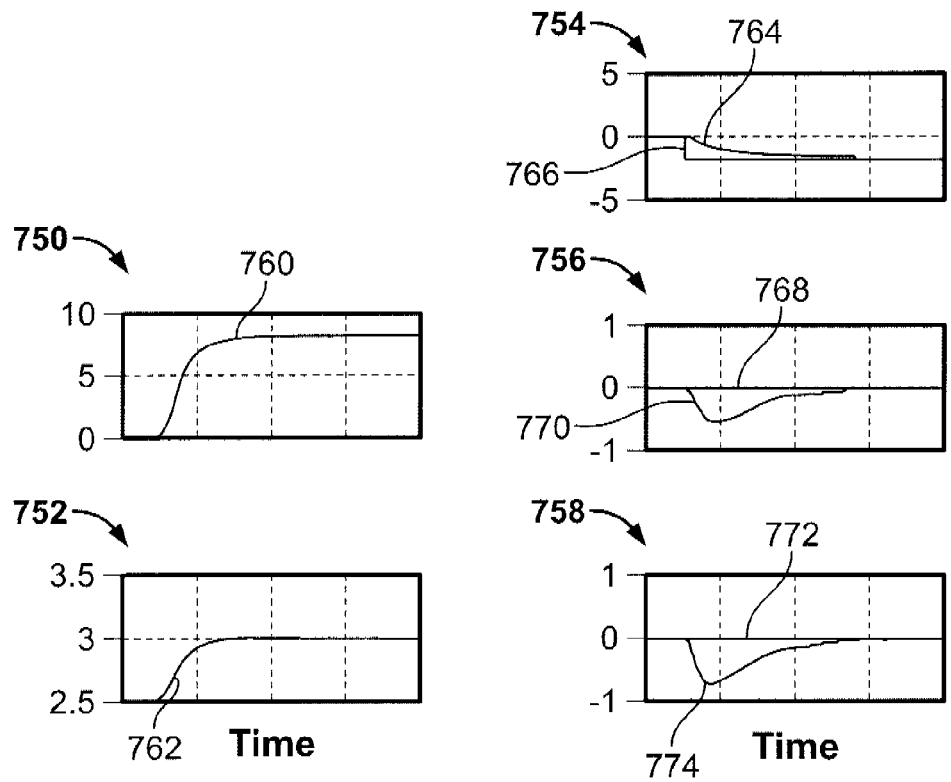
FIG. 9 illustrates a plurality of graphs showing system response illustrating an exemplary effect of disturbance signals without applying the method of reducing an effect of a disturbance.

FIG. 9 illustrates a plurality of exemplary graphs 750, 752, 754, 756, and 758. Graph 750 illustrates a plot of a disturbance signal 760 versus the time t, graph 752 illustrates a plot of a disturbance signal 762 versus the time t, and graph 754 illustrates a plot of a dynamic system output signal 764 versus the time t and a desired response 766 of a dynamic system, which is not coupled to DDRS 14, versus the time t. Moreover, graph 756 illustrates a plot of a dynamic system output signal 770 versus the time t and a desired response 768 of a dynamic system, which is not coupled to DDRS 14, versus the time t. Additionally, graph 758 illustrates a plot of a dynamic system output signal 774 versus the time t and a desired response 772 of a dynamic system, which is not coupled to DDRS 14, versus the time t. When disturbance signals 760 and 762 are input to a dynamic system, which is not coupled to DDRS 14, the dynamic system generates dynamic system output signals 764, 770, and 774. Moreover, a dynamic system output signal 764 slowly converges to desired response 766. Additionally, a coupling between desired response 770 and dynamic system output signal 770 is large, such as 38%-42%. Further, a coupling between desired response 772 and dynamic system output signal 774 is large, such as 38%-42%.

Figure 10:
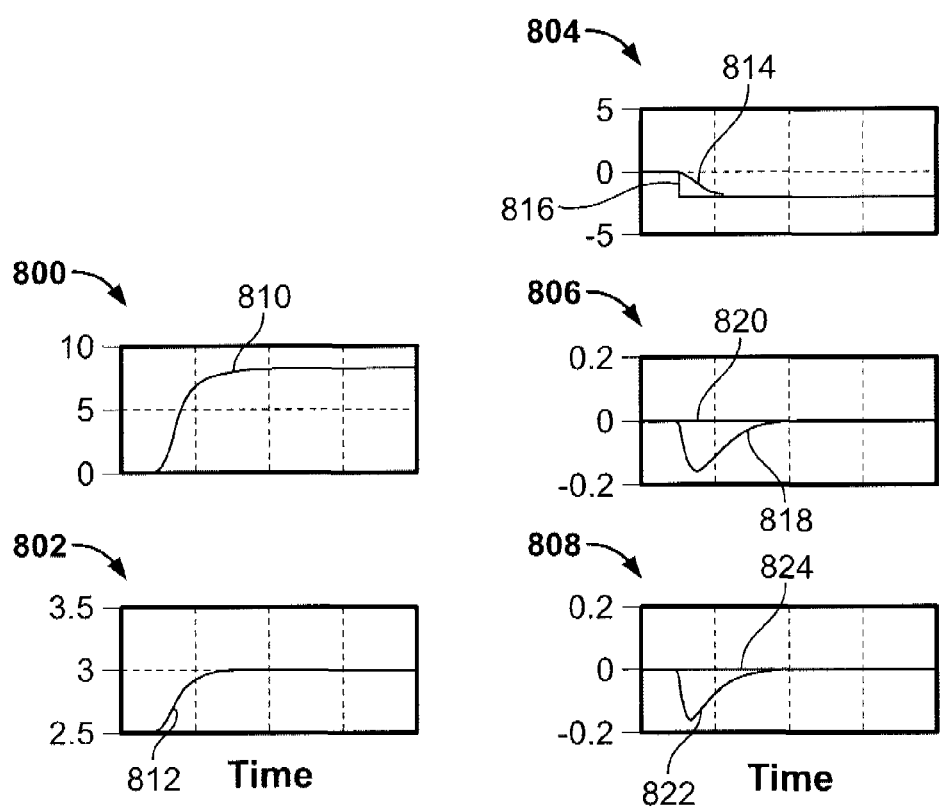
FIG. 10 illustrates a plurality of graphs showing system response illustrating an exemplary effect of disturbance signals and applying the method of reducing an effect of a disturbance.

FIG. 10 illustrates a plurality of exemplary graphs 800, 802, 804, 806, and 808. Graph 800 illustrates a plot of a disturbance signal 810 versus the time t, graph 802 illustrates a plot of a disturbance signal 812 versus the time t, graph 804 illustrates a plot of a dynamic system output signal 814 versus the time t and a desired response 816 of dynamic system 16 versus the time t. Moreover, graph 806 illustrates a plot of a dynamic system output signal 818 versus the time t and a desired response 820 of dynamic system 16 versus the time t. Additionally, graph 808 illustrates a plot of a dynamic system output signal 822 versus the time t and a desired response 824 of dynamic system 16 versus the time t. When disturbance signals 810 and 812 are input to dynamic system 16, dynamic system 16 generates dynamic system output signals 814, 818, and 822. Moreover, a difference between dynamic system output signal 814 and desired response 816 is small and dynamic system output signal 814 quickly converges to desired response 816. Additionally, a coupling between desired response 820 and dynamic system output signal 818 is small, such as 7%-8%. Further, a coupling between desired response 824 and dynamic system output signal 822 is small, such as 7%-8%. It is evident from FIGS. 8 and 10 that the coupling between desired response 820 and dynamic system output signal 818 is similar to that between desired response 720 and dynamic system output signal 718, and the coupling between desired response 824 and dynamic system output signal 822 is similar to that between desired response 724 and dynamic system output signal 722 when no disturbance is present.

Technical effects of the herein described systems and methods for reducing an effect of a disturbance include reducing an effect of the discrete disturbance signal $d_k$ on dynamic system output signal $y_k$. The effect of the discrete disturbance signal $d_k$ is reduced by generating an equation, such as equation (25) or (34), for the incremental discrete DDRS output signal Wk as a function of the incremental discrete disturbance signal $\tilde{d}_k$, which is a change of a difference between the discrete disturbance signal $d_k$ and the discrete disturbance signal $d_{k-1}$ By generating $\ddot{u}_k$ as a function of $\tilde{d}_k$, changes, such as $\tilde{d}_k$, in the discrete disturbance signal $d_k$ are considered in reducing the effect of the discrete disturbance signal $d_k$ and DDRS 14 attenuates an impact of the discrete disturbance signal $d_k$ over dynamic system 16 over a broad frequency range, such as ranging from and including 0 hertz (Hz) to the closed loop bandwidth of the dynamic system. For systems such as gas turbine this range would be from 0 Hz to 4 Hz, for electrical systems this range would be from 0 Hz to 10 kilo hertz (KHz). Other technical effects of the systems and methods for reducing an effect of a disturbance include reducing coupling between a desired response of dynamic system 16 and dynamic system output signal 24. Yet other technical effects include providing a quick convergence of a dynamic system output signal 24 to a desired response. It is noted that DDRS 14 does not wait to receive $y_{k-1}$ to generate $u_k$ and changes $u_k$ at the same time or during the same sampling period as $d_k$ is received by dynamic system 16. Hence, an effect of $d_k$ is reduced on dynamic system 16 before $d_k$ enters and adversely affects dynamic system 16.

While the invention has been described in terms of various specific embodiments, those skilled in the art will recognize that the invention can be practiced with modification within the spirit and scope of the claims.

What is claimed is:

1. A method for reducing an effect of a disturbance signal on an output of a dynamic system, said method comprising:
    generating an increment of the disturbance signal; and
    modifying an incremental signal input to the dynamic system based on the increment of the disturbance signal, thereby reducing the effect of the disturbance signal on the output of the dynamic system and;
    wherein generating an increment comprises calculating a difference between two values sampled during consecutive sampling periods, wherein a first one of the two values is sampled during a first one of the consecutive sampling periods, and wherein a second one of the two values is sampled during a second one of the consecutive sampling periods, and wherein the two values are disturbances.

2. A method in accordance with claim 1, wherein said modifying the incremental signal input to the dynamic system comprises changing the incremental signal input to the dynamic system based on a relative degree of the dynamic system, wherein the relative degree is greater than or equal to zero.

3. A method in accordance with claim 1, wherein the disturbance signal comprises a signal that is configured not to affect the output of the dynamic system.

4. A method in accordance with claim 1 wherein the dynamic system is a multiple-input-multiple-output system.

5. A method in accordance with claim 1 further comprising estimating an additional signal generated within a sampling period of the disturbance signal based on the disturbance signal, wherein the additional signal represents a disturbance affecting the dynamic system.

6. A method in accordance with claim 1, wherein the first and second ones of the two values are input to the dynamic system.

7. A processor-based method that facilitates reducing an effect of a disturbance signal on an output of a dynamic system, said processor-based method comprising:
    generating an increment of the disturbance signal; and
    modifying an incremental signal input to the dynamic system based on the increment of the disturbance signal, thereby attenuating the effect of the disturbance signal, and
    wherein said incremental signal input to the dynamic system is performed by calculating u_k=u_k−1+ K_1~v_K_3F_k+K_d~d_k, wherein u_k is a signal input to the dynamic system, u_K−1 is a signal input to the dynamic system one sampling period before u_k is input to the dynamic system, K_1, K_3, and K_d are matrices, ~v_k is an incremental signal output by a controller to the processor, ~d_k is an incremental disturbance input to the dynamic system, and F_k is a function of a plurality of values, at a reference time, of a disturbance input to the dynamic system, a state of a portion of the dynamic system, and a signal input to the dynamic system.

8. A processor in accordance with claim 7, wherein said processor is further configured to generate the increment as a difference between two values sampled during consecutive sampling periods, wherein a first one of the two values is sampled during a first one of the consecutive sampling periods, and wherein a second one of the two values is sampled during a second one of the consecutive sampling periods, and wherein the first and second ones of the two values are disturbances.

9. A processor in accordance with claim 7, wherein said processor modifies the incremental signal input to the dynamic system by changing the incremental signal input to the dynamic system based on a relative degree of the dynamic system, wherein the relative degree is greater than or equal to zero.

10. A processor in accordance with claim 7, wherein the disturbance signal comprises a signal that is configured not to affect the output of the dynamic system.

11. A processor in accordance with claim 7, wherein the dynamic system includes one of a single-input-single-output system and a multiple-input-multiple-output system.

12. A processor in accordance with claim 7, wherein said processor configured to estimate an additional signal generated within a sampling period of the disturbance signal based on the disturbance signal, wherein the additional signal represents a disturbance affecting the dynamic system.

13. A processor in accordance with claim 7, wherein the incremental signal input to the dynamic system comprises a difference between two values sampled during consecutive sampling periods, wherein a first one of the two values is sampled during a first one of the consecutive sampling periods, wherein a second one of the two values is sampled during a second one of the consecutive sampling periods, and wherein the first and second ones of the two values are input to the dynamic system.

14. A method for attenuating an impact of a disturbance on a dynamic system, comprising:
generating an increment of a disturbance signal; and
modifying an incremental signal input to the dynamic system based on the increment of the disturbance signal, thereby attenuating the effect of the disturbance signal and adjusting an output of said dyanmic system by calculating u_k=u_k-1+K_1~v_k+K_3F_k+K_d~d_k, wherein u_k is a signal output by a controller to the dynamic system for attenuating the disturbance, u_K-1 is a signal output by the controller to the dynamic system one sampling period before u_k is input to the dynamic system, K_1, K_3, and K_d are matrices, ~v_k is an incremental signal output by a processor to the controller, ~d_k is an incremental disturbance input to the dynamic system, and F_k is a function of a plurality of values, at a reference time, of a disturbance input to the dynamic system, a state of a portion of the dynamic system, and a signal input to the dynamic system;
wherein said attenuating is across a range of frequencies ranging from and including 0 Hz to the a bandwidth of the dynamic system.

15. A method in accordance with claim 14, wherein said attenuating the impact of the disturbance comprises deriving $\dot{x}_t = f(x_t, u_t, d_t)$, $y_t = h(x_t, u_t, d_t)$, $$\dot{\tilde{x}}_t = A_c \tilde{x}_t + B_{cu} \tilde{u}_t + B_{cd} \tilde{d}_t + f,$$

and $\overline{y}_t = h(\overline{x}_t, \overline{u}_t, \overline{d}_t)$, wherein $f$ and h are nonlinear functions, $x_t$ is a state of a portion of the dynamic system, t is continuous time, $\dot{x}_t$ is a derivative, with respect to the time t, of the state $x_t$, $u_t$ is a signal output by a controller to the dynamic system, $d_t$ is the disturbance input to the dynamic system, and each of $A_c$, $B_{cu}$, and $B_{cd}$ are a matrix, $\tilde{x}_t$ is an increment to a particular value $\overline{x}_t$ of the state at a reference time, $\tilde{u}_t$ is an increment to a particular value $\overline{x}_t$ of $u_t$ at the reference time, and $\tilde{d}_t$ is an increment to a particular value of the disturbance $d_t$ at the reference time.

16. A method in accordance with claim 14, wherein said $K_d$ is computed at least one of before and during energization of the dynamic system.

17. A method in accordance with claim 14, wherein said $u_k$ is changed at the same time the disturbance enters the dynamic system to attenuate the effect of the disturbance on the dynamic system.

* * * * *